UNITED STATES PATENT OFFICE.

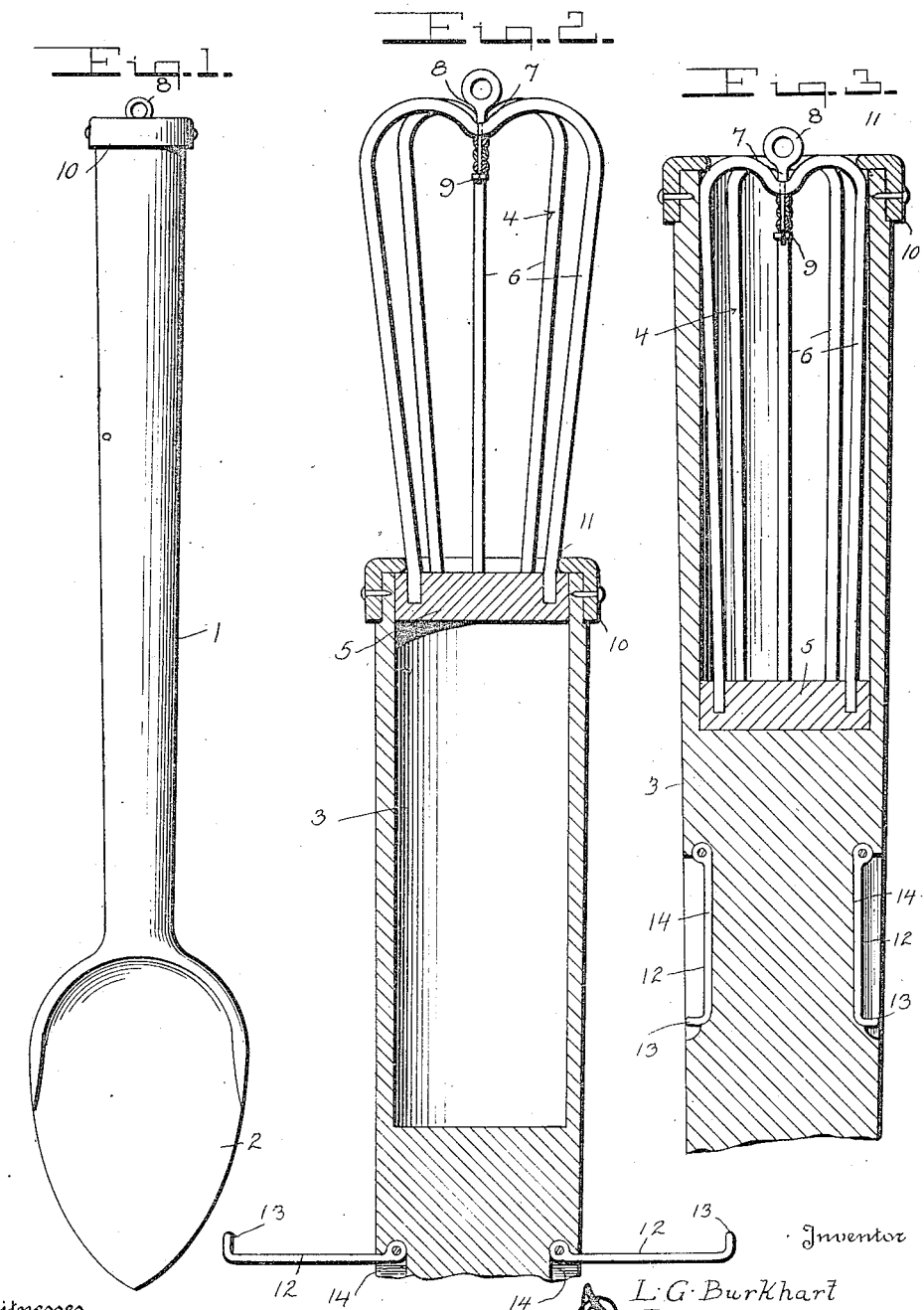

LUCY GERTRUDE BURKHART, OF FLAGSTAFF, ARIZONA.

COMBINED EGG-BEATER AND CAKE-SPOON.

1,282,537.  Specification of Letters Patent.  Patented Oct. 22, 1918.

Application filed January 27, 1917. Serial No. 144,862.

*To all whom it may concern:*

Be it known that I, LUCY GERTRUDE BURKHART, a citizen of the United States, residing at Flagstaff, in the county of Coconino and State of Arizona, have invented certain new and useful Improvements in Combined Egg-Beaters and Cake-Spoons; and I do hereby declare the following to be a full, clear, and exact description of the invention, such as will enable others skilled in the art to which it appertains to make and use the same.

The primary object of this invention is to associate, in a novel manner, with the handle of a spoon an egg beater, so that when the latter is not in use it can be concealed within the body of the handle of the spoon so as to be out of the way when the spoon is employed.

Another object of the invention is the provision of an implement including a spoon and egg beater so associated that a single handle will be common to both.

Other objects will appear and be better understood from that embodiment of my invention of which the following is a specification, reference being had to the accompanying drawing forming a part thereof, in which:

Figure 1 is a vertical elevation of the combined spoon and egg beater, with the latter concealed within the handle of the spoon, Fig. 2 is a detail longitudinal sectional view taken through the free end of the handle of the spoon, showing the egg beater in operative position and partially in section, and Fig. 3 is a longitudinal sectional view, taken through the free end of the handle with the egg beater in inoperative position and concealed within the handle, with the egg beater partially in section.

Referring to the drawing in detail, the numeral 1 designates a handle having one end provided with a spoon head 2. The opposite end of the handle 1 is recessed internally to provide a harbor or housing 3. Associated with the last-mentioned end of the handle 1 is an egg beater, designated as an entirety by the numeral 4, and is shown as consisting of a slidable circular head 5 that is mounted within the harbor or housing 3, and a plurality of inverted and substantially U-shaped elements 6, which have their free ends of the sides thereof connected to the slidable head 5. Each of the U-shaped elements 6 is formed of a single piece of resilient wire, and the sides of the element converge toward the head 5, as shown more particularly in Fig. 2 of the drawing. The U-shaped elements 6 are so arranged with relation to one another that the connecting portions for the sides of the U-shaped elements 6 intersect, and are depressed inwardly, at the points of intersection, as shown at 7. An eye bolt 8 has the shank portion thereof extending through openings in the depressed portions of the connecting portions for the sides of the U-shaped elements 6, and has the inner end thereof threaded for the reception of a nut 9, as shown in Fig. 2 of the drawing. When the egg beater 4 is not in use the same lies within the harbor or housing 3 in the handle 1, the resiliency of the elements 6 permitting the elements to be flexed sufficiently to be inserted within the housing, as shown in Fig. 3. The periphery of the head 5 snugly engages the walls of the harbor or housing 3 sufficiently to prevent the head from working inwardly, when the egg beater 4 is in outward or operative position, and during the egg beating operation. The head of the eye bolt 8 serves as a handle to permit of the convenient withdrawal of the egg beater from the harbor or housing 3, when desired. The free end of the handle 1 is provided with a cap 10 consisting of a ring having an inwardly extending annular flange 11, which overhangs the inner side of the housing. The egg beater 4 slides through the ring when the latter is moved to operative position. It will be noted, by referring to Fig. 2 of the drawing, that when the egg beater 4 is withdrawn from the harbor or housing 3, to operative position, the side portions of the elements 6 assume the positions shown in Fig. 2, the said side portions of the elements 6 snugly engaging the wall of the opening 11, so as to serve as additional means for preventing the egg beater 4 from working inwardly during the egg beating operation. When the beater is positioned in the housing in its inoperative position, the members 6 are compressed as clearly shown in Fig. 3 and frictionally engage the inner side face of the housing and the flange 11 overhangs the inner side of the housing and engages the members 6 and positively retains the same against accidental movement.

The handle 1 is provided, at a point approximately centrally thereof, and at diametrically opposite points, with a pair of pivoted arms 12, which have their free ends bent laterally, as shown at 13. When the spoon portion of the implement is in operation, the pivoted arms 12 lie within recesses 14 formed in the handle, and during the egg beating operation, the arms 12 extend outwardly, as shown in Fig. 2, and provide means which serves as a guard against which the operator's hand can be engaged so as to prevent the hand from slipping, or moving in the direction of the egg beater 4, during the egg beating operation.

It is evident that various changes might be resorted to in the construction, form and arrangement of the several parts without departing from the spirit and scope of the invention as claimed.

What I claim is:

1. An implement of the class described including a handle having one end recessed internally to provide a housing, a beater associated with the handle and adapted when in inoperative position to lie within the housing, and including a head portion having a plurality of U-shaped spring elements having the free ends of their sides connected to the head, the connecting portions for the sides of the U-shaped elements being arranged in intersecting relation, and an element extending through the points of intersection of the connecting portions for the sides of the U-shaped elements, said U-shaped spring elements adapted to frictionally engage the sides of the housing to prevent accidental displacement of the same from the housing.

2. An implement of the class described including a handle having one end provided with an internal recess to provide a housing; a flanged cap fitted on the mentioned end of the handle and having an opening therein; a beater slidably associated with the handle and adapted, when not in use, to lie within the handle and including a head; and a plurality of U-shaped elements formed of resilient material carried by the head and adapted, when the beater is in operative position, to extend through the opening in the cap, and when in inoperative position to frictionally engage the sides of the housing to prevent accidental displacement thereof.

3. An implement of the class described including a handle having one end provided with an internal recess to provide a housing, a beater slidably associated with the handle and arranged when not in use to fit in the recess and including a plurality of compressible spring whipping elements, said elements being arranged to frictionally engage the sides of the recess to prevent accidental displacement of the beater when the same is in its inoperative position.

4. An implement of the class described including a handle having one end provided with an internal recess to provide a housing, a ring fitted over the open end of the housing, an inwardly extending annular flange formed on the ring, a beater slidably associated with the handle and arranged when not in use to fit in the recess and including a plurality of compressible spring whipping elements, said elements being arranged to frictionally engage the sides of the recess to prevent accidental displacement of the beater when the same is in its inoperative position, said flange extending inwardly to a point beyond the inner side of the housing to overhang the same and engage the beater to positively retain the same in its inoperative position.

In testimony whereof I affix my signature in presence of two witnesses.

LUCY GERTRUDE BURKHART.

Witnesses:
ESSEX J. BOYER,
FRANCIS D. CRABLE.